United States Patent
Tang et al.

(10) Patent No.: US 12,141,155 B2
(45) Date of Patent: Nov. 12, 2024

(54) EFFICIENT ACCESS OF CHAINABLE RECORDS

(71) Applicant: DRFIRST.COM, INC., Rockville, MD (US)

(72) Inventors: Zilong Tang, North Potomac, MD (US); James F. Chen, Naples, FL (US)

(73) Assignee: DrFirst.com, Inc., Rockville, MD (US)

( * ) Notice: Subject to any disclaimer, the term of this patent is extended or adjusted under 35 U.S.C. 154(b) by 0 days.

(21) Appl. No.: 18/336,449

(22) Filed: Jun. 16, 2023

(65) Prior Publication Data
US 2024/0086414 A1    Mar. 14, 2024

Related U.S. Application Data

(63) Continuation of application No. 17/302,830, filed on May 13, 2021, now Pat. No. 11,681,719, which is a
(Continued)

(51) Int. Cl.
*G06F 16/2458*    (2019.01)
*G06F 16/21*    (2019.01)
(Continued)

(52) U.S. Cl.
CPC ........ *G06F 16/2471* (2019.01); *G06F 16/213* (2019.01); *H04L 9/0643* (2013.01); *H04L 9/50* (2022.05)

(58) Field of Classification Search
CPC ............... G06F 16/2471; G06F 16/213; H04L 9/0643; H04L 9/50
See application file for complete search history.

(56) References Cited

U.S. PATENT DOCUMENTS

| 2016/0283920 A1 | 9/2016 | Fisher et al. |
| 2017/0046526 A1 | 2/2017 | Chan et al. |
| 2017/0163733 A1 | 6/2017 | Grefen et al. |

(Continued)

FOREIGN PATENT DOCUMENTS

| AU | 2001247231 B2 | 1/2007 |
| AU | 2015249134 A1 | 11/2015 |

(Continued)

OTHER PUBLICATIONS

First Office Action for Chinese Application No. 202080014685.9, mailed Mar. 15, 2024, 7 pages.
(Continued)

*Primary Examiner* — Dangelino N Gortayo
(74) *Attorney, Agent, or Firm* — Brake Hughes Bellermann LLP

(57) ABSTRACT

A method is provided for managing event access policies using a user interface. The method includes defining event access policies to be applied to incoming transactions, where each policy identifies a field identifier. The method further includes applying the event access policies to incoming transactions, resulting in the generation of event access records for each policy determined to apply to the incoming transactions. The event access records include field values captured from the transaction and a corresponding group identifier generated for the transaction. Additionally, event blocks are written to an event graph for the incoming transactions, independent of applying the event access policies. Each event block includes a group identifier, content, and a hash for the transaction. The method enables efficient and flexible management of event access policies that facilitate later transaction querying.

20 Claims, 4 Drawing Sheets

Related U.S. Application Data continuation of application No. 16/277,590, filed on Feb. 15, 2019, now Pat. No. 11,010,394.

(51) Int. Cl.
  *H04L 9/00* (2022.01)
  *H04L 9/06* (2006.01)

(56) References Cited

U.S. PATENT DOCUMENTS

| | | |
|---|---|---|
| 2017/0221052 A1 | 8/2017 | Sheng et al. |
| 2017/0228731 A1 | 8/2017 | Sheng et al. |
| 2018/0240112 A1 | 8/2018 | Castinado et al. |
| 2018/0255090 A1 | 9/2018 | Kozloski et al. |
| 2018/0285479 A1 | 10/2018 | Mackay et al. |
| 2018/0285996 A1 | 10/2018 | Ma |
| 2018/0294966 A1 | 10/2018 | Hyun et al. |
| 2018/0307857 A1 | 10/2018 | Beecham et al. |
| 2019/0005470 A1 | 1/2019 | Uhr et al. |
| 2019/0036887 A1 | 1/2019 | Miller |
| 2019/0098013 A1 | 3/2019 | Wilkinson |
| 2019/0108323 A1 | 4/2019 | Mintz et al. |
| 2019/0122769 A1 | 4/2019 | Wright et al. |
| 2019/0147553 A1 | 5/2019 | Reber et al. |
| 2019/0205873 A1 | 7/2019 | Kamalsky et al. |
| 2019/0236606 A1 | 8/2019 | Padmanabhan et al. |
| 2020/0019946 A1 | 1/2020 | Walker et al. |
| 2020/0034553 A1 | 1/2020 | Kenyon et al. |
| 2020/0228316 A1 | 7/2020 | Cahill |
| 2020/0296130 A1* | 9/2020 | Xie ............... H04L 63/1416 |
| 2020/0356547 A1* | 11/2020 | Furukawa ........ G06F 16/2379 |
| 2021/0182433 A1* | 6/2021 | Yan ................... G06F 21/64 |

FOREIGN PATENT DOCUMENTS

| | | |
|---|---|---|
| CN | 106815728 A | 6/2017 |
| CN | 107368259 A | 11/2017 |
| CN | 108764877 A | 11/2018 |
| CN | 108932297 A | 12/2018 |
| CN | 109087105 A | 12/2018 |
| CN | 109299336 A | 2/2019 |
| TW | 201721539 A | 6/2017 |
| TW | 201732706 A | 9/2017 |

OTHER PUBLICATIONS

Li, X., et al.; "Research on an Agent-Based Intelligent Soft Computing Society of Oil Production"; Information Technology; No. 7; Jul. 15, 2006; 51 pages.

Price, W., et al.; "Dynamic Equivalents from On-Line Measurements"; IEEE Transactions on Power Apparatus and Systems; vol. 94; No. 4; Jul. 1, 1975, pp. 1349-1357.

Office Action for Taiwanese Application No. 109104795, mailed Sep. 7, 2023, 13 pages.

U.S. Appl. No. 17/302,830, filed May 13, 2023, Pending.

U.S. Appl. No. 16/277,590, filed Feb. 15, 2019, Issued.

International Search Report and Written Opinion for International Application No. PCT/US2020/018404, mailed May 8, 2020, 13 pages.

"Blockchain", Wikipedia; XP055690756, Feb. 5, 2019, 19 pages.

Notice of Allowance for Chinese Application No. 202080014685.9, mailed Jul. 24, 2024, 4 pages.

* cited by examiner

EFFICIENT ACCESS OF CHAINABLE RECORDS

CROSS-REFERENCE TO RELATED APPLICATIONS

The present application is a continuation of, and claims priority to, U.S. patent application Ser. No. 17/302,830, filed May 13, 2021, which is a continuation of U.S. patent application Ser. No. 16/277,590, filed Feb. 15, 2019, entitled "EFFICIENT ACCESS OF CHAINABLE RECORDS", the disclosures of which are incorporated herein by reference in their entireties.

TECHNICAL FIELD

The present teaching relates to methods, systems and programming for accessing blockchain data. Particularly, the present teaching is directed to a flexible schema for defining data fields used to efficiently access blockchain data and reducing the time needed to locate and verify a particular chain/chains of special interest.

BACKGROUND

Blockchain is a technology that ensures that data, once generated cannot be easily modified without detection. More specifically, a blockchain is a series of data blocks linked cryptographically, with each block including a cryptographic hash of the previous, i.e., predecessor, block. To identify a predecessor block, a computer system performs a brute-force search of blocks in the blockchain. The brute-force search includes generating a hash of the blocks in the blockchain until a block matching the desired hash is located. If no block matching the hash is found, then the chain is broken, indicating that data has been modified. Thus, blockchain is resistant to data modification. Because of this property, blockchain can be used for secure purposes, such as digital currency and audit records. For example, a computer system may generate a blockchain block (or blocks) for auditable events.

All blocks in a blockchain are structured/organized in a comprehensive graph, or improved Merkle tree structure. As blocks are added, the ledger of the chain (e.g., in a graph or Merkle tree) grows. Some ledgers are stored in a public cloud. Other ledgers are stored locally and not accessible to the public.

Audit blockchains can grow quickly, with several new nodes being added every second. Audit blockchains also tend to be wider over time (e.g., the genesis or root block having a very high degree of branching) rather than deep. For example, audit blockchains may include millions of leaf nodes. While audit blockchains provide a highly stable audit trail, it can quickly become computationally prohibitive to find any particular piece of data within the Merkle tree. Put another way, the computational time needed to identify and verify any particular chain is so high that real-time querying of the data is not generally achievable.

SUMMARY

Implementations provide a flexible schema for efficiently querying a Near-Graph type of Merkle tree, such as a private audit trail of chainable blocks. Implementations generate an event group identifier for each auditable event, which is included in each block of the chain generated for the event. Implementations include building a set of access policies that identify what data items in each auditable event are made available for query purposes. The access policies make the system highly customizable and flexible. As auditable events occur, the system consults the access policies and, for each matching policy, associates the data item specified in the policy with the group identifier in an event access table. The system uses the event access table to locate group identifiers associated with a data item responsive to a query. The system then uses the group identifiers to greatly reduce the number of blocks in the chain subjected to a brute force search (e.g., hashing of the content). After identifying the blocks in the chain that include the group identifier, the system can verify that the chain is not broken and obtain other data elements not included in the event access table to respond to the query in real time.

Without disclosed implementations, querying of the audit chain data in real time (e.g., for interactive query purposes) is practically impossible, as the brute force search would require millions of hash calculations. Implementations operate in an environment where chainable blocks include a predecessor hash but do not include other kinds of pointers (e.g., address pointers) to other blocks. Because of the lack of such pointers, the only way to find a predecessor block of a current block is to hash the content of blocks in the graph until a block is located whose hash matches the hash stored in the current block. In some implementations, when the graph of chainable event blocks includes millions of blocks, such brute force searching would result in unacceptable query response times. Identifying predecessor blocks is necessary to verify that the chain is not broken and, optionally, to identify additional data items to be included in a response to the query. Query response time is further negatively affected in implementations that encrypt the data that is recorded in each block. This would result in the need to decrypt the blocks to locate the blocks that store a data item responsive to a query in order to begin looking for predecessors. Disclosed implementations solve these issues, making it possible to achieve acceptable query response times of chainable event graphs.

Disclosed implementations achieve an acceptable query response time by capturing certain data items and associating those data items with an event group identifier. Implementations capture this data as new blocks are added to the chain. In an auditing system, certain data events trigger generation of one or more new blocks. The blocks may all be related to a single transaction, which is assigned a group identifier. Thus, every block generated during the transaction is written with the same group identifier. A transaction can be definable and may include several individual events. For example, a bank may define a single transaction as everything that occurs after a patron provides a debit card to an ATM. The transaction may include several individual events recorded in separate blocks, such as entering a PIN number, reading a record from a database, receiving a selection of a deposit transaction, receiving input from the patron regarding the deposit, performing OCR of a deposited check, writing information to the database, etc. In this example, although each event may generate one or more separate blocks, each block will be assigned the same group identifier, i.e., the identifier for the transaction. In addition, implementations enable the bank to select which data items can be used to access the blocks. For example, the bank may select the patron's last name to be included in event access data. Thus, disclosed implementations will record the last name with the group identifier in an event access data table. Later, if the system receives a query requesting all deposit records for a patron with the last name of "Bush" during October, the system can use the event access data table to narrow down the number of blocks in the chain to search and identify responsive blocks. The system may verify that the chains that include responsive blocks are unbroken and/or look for additional data items to include in the response to the query from the chain.

Disclosed implementations may include a user interface that enables a data owner to dynamically modify the event policies used to generate records in the event access data. Thus, for example, new policies could be added, existing policies could be modified, and policies deleted as requirements change. As soon as new policies are added, implementations can begin adding records into the event access table and using those records to respond to queries. Thus, disclosed implementations provide an easily adaptable technical solution of accessing blocks in a large chainable event graph.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

Example embodiments are described with regard to health related entities and financial institutions as the data owners. However, embodiments are not limited to the healthcare or financial industries and the inventive concepts can be applied to any setting in which chainable event records are generated for transactions and efficient, convenient access to the blocks in the ledger of chainable events without specialized hardware is desired. For example, the disclosed techniques may be used in retail industries, educational institutions, criminal justice systems, corporations, etc.

To solve the problems associated with difficulty in querying chainable event block data, such as the computer resources needed to perform a brute force search of the blocks and the desire to expose only certain information from the transactions to query, implementations provide a system that tags chainable event blocks with a group identifier to limit the number of blocks subject to a brute force search. Implementations also provide an interface for defining event access policies. Event access policies specify the fields that can be used to search the chainable event block data. Implementations apply the policy entries to new events that trigger blockchain block generation so that the field identified in an event access policy is linked to the group identifier used to tag the corresponding block. Implementations include an interface that exposes the accessible fields for querying. Not all data items included in the content of a chainable event block may be accessible. The interface that enables the owner of the data to set event access policies may also enable the owner of the data to identify specific data items within a transaction or event that can be used in a query or returned as part of the query result.

Figure 1:
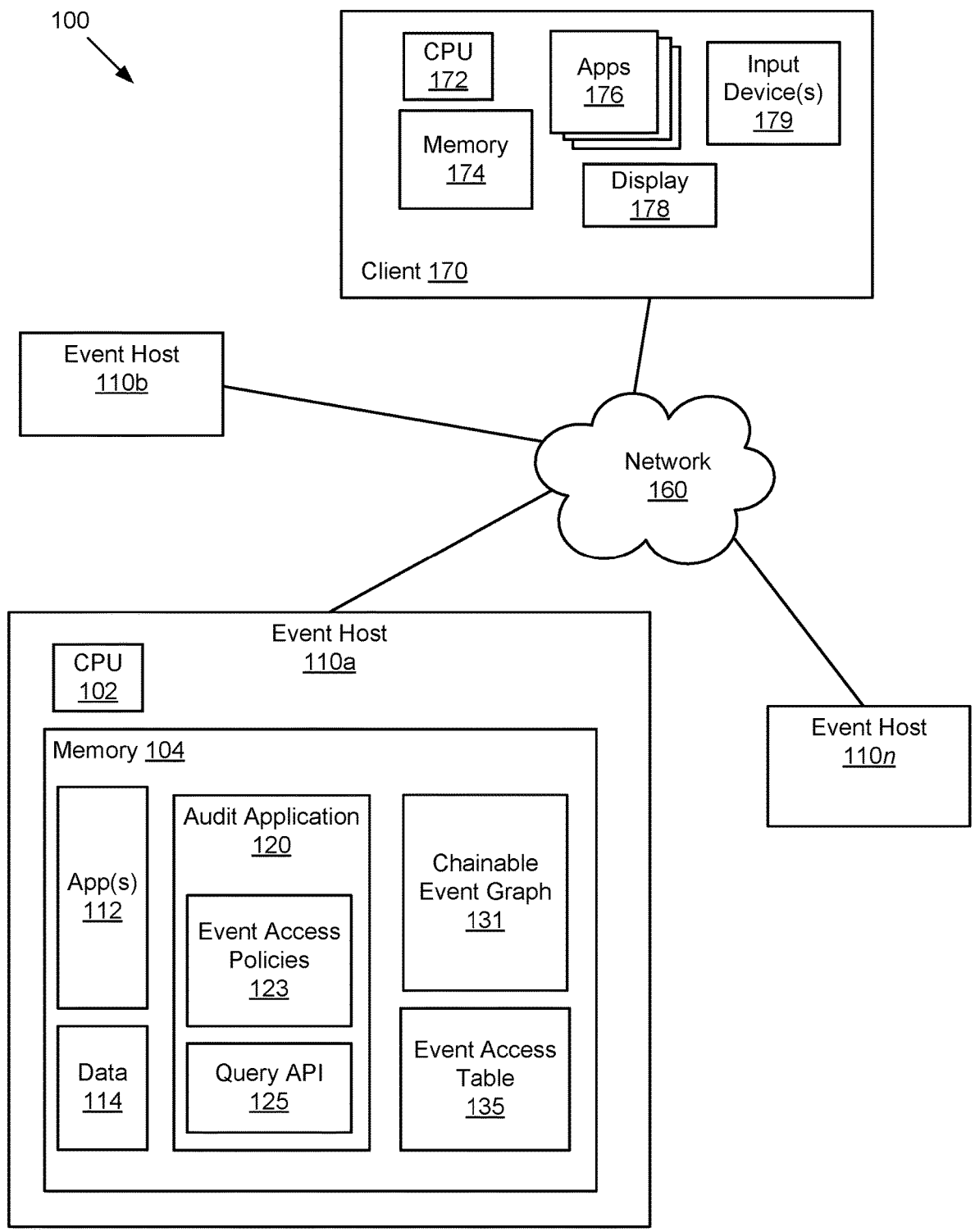
FIG. 1 describes a high level depiction of a system configuration, according to a disclosed embodiment.

As shown in FIG. 1, a networked environment 100 may include a number of computing devices that are in data communication with each other through a network 160 or a series of networks 160. The network 160 may include the Internet, a local area network (LAN), a wide area network (WAN), a cellular network (e.g., 5G cellular), an intranet, etc., or some combination of these. For example, client 170 may communicate with one or more event hosts 110 via a LAN, a cellular network, an intranet, or the Internet. Event host 110a may communicate with event host 110b and/or 110n via any combination of the Internet, intranet, a WAN, a LAN, a cellular network, wired connection, wireless connection, etc. In some implementations, the network 160 represents more than one network, e.g., the Internet and a WAN or the Internet and a WI-FI or cellular network.

The computing devices in environment 100 may include host computers, such as event hosts 110a, 110b, and 110n. The computing devices may also include client devices, such as client 170, which provide a user interface, for example via a browser, through a mobile application, or some other interface, for a human user to access various applications available over a network 160, such as the Internet or an intranet. The various applications include applications 112 provided by event host 110a and similar applications provided by other event hosts, such as event host 110b and/or event host 110n.

The event host 110a (e.g., also 110b, 110n, etc.) may be a web-based system for an organization, such as a financial organization, an educational institution, or a healthcare related organization, such as, for example, a hospital, a clinic, a pharmacy, or an electronic medical records system (EMR) for a healthcare provider's office. The event host 110a may require its users (e.g. employees or customers) to login with login credentials (typically a username and a password or token) before accessing the records and applications 112 of the event host 110a. The event host 110a may include a computing device, such as a computer, a server or a number of communicatively connected distributed servers, a mainframe, etc., that has one or more processors 102 (e.g., a processor formed in a substrate) configured to execute instructions stored in memory 104, such as main memory, RAM, flash, cache, or disk. The instructions may be stored in a runtime environment, functional modules and/or engines, e.g., applications 112, and may provide functionality to support the functioning and operation of a business entity, e.g., typical banking applications, typical registration and application systems of an educational institution, typical diagnosis, prescription, and billing applications of an EMR, etc.

The event host 110a may include one or more applications 112 that provide access to data 114. The event host 110a may also include an audit application 120 that works in conjunction with (is a part of, is called by, etc.) one or more of the applications 112 and captures audit records for certain events that occur in the applications 112. For example, many entities are required by law, regulation, or best practices to keep a record of not only changes to (inserts, deletes, updates) some or all of the data 114 but also accesses (reads) of some of the data 114. Such audit records may also be referred to as an audit trail of activities performed against the data 114. Preferably, an audit trail cannot itself be tampered with. Accordingly, an entity may operate an event host system 110a that stores audit records as a chain, e.g., in a chainable event graph 131. The chainable event graph 131 may have a genesis block for the business entity, which is the root of the chain. Each chain in the chainable event graph is a successor of the genesis block. In some implementations, each chain may represent a transaction made up of individual events. A transaction is defined by the business entity that controls the data 114. In other words, the data owner defines what events are included in each chain. The definition of a transaction uses known techniques, is implementation specific and, as such, the details are outside the scope of this disclosure. However, for each new transaction (however defined), the audit application 120 is configured to generate a unique group identifier. A group identifier is included in each block of the chainable event graph 131. The blocks relevant to a particular transaction can be located using the group identifier.

The chainable event graph 131 is unlike conventional database records. First, conventional database records are typically amenable to change. Chainable event blocks (e.g., chainable event records) are not amenable to change, and indeed a change in any data block in the ledger results in a broken chain unless all successor blocks are also identified and modified. This immutability makes chainable event graphs useful for auditing purposes. The chainable event graph 131 is an improved Merkle tree, where the different blocks are linked only via inclusion of a hash of the predecessor block. Searching for blocks in such a tree is a brute force endeavor and computationally expensive. If a leaf node is known, following the chain backwards requires hashing blocks in the chainable event graph 131 to determine which block is the predecessor block. A block is a predecessor block if a hash of the block's content matches the hash stored in the current (leaf) node. Once that block is identified, the process is repeated to find the next predecessor. Thus, following a chain conventionally requires a large amount of computer processing cycles and time. Conventionally, special processors are used to verify chainable event graphs. There is no index for chainable event blocks, which is the method used to query data in conventional databases. Moreover, in a Merkle tree with a high number (hundreds of thousands or even millions) of leaf nodes, keeping track of leaf nodes may be impractical. Moreover, a brute force search of a chain is computationally prohibitive and wholly unacceptable for an online query process, where responses are expected within a few seconds.

The chainable event graph 131 may record important aspects of data accesses/changes. The important aspects can include who is accessing the data, when the access occurs, what data is accessed, what data is changed, how the data is accessed, where the data is accessed, etc. All of these aspects can be captured in one or more events during a transaction.

To address the technical problems of efficiently accessing blocks in a chain of events, implementations include the event access table 135 generated using event access policies 123. The audit application 120 generates rows or records in the event access table 135 based on the event access policies 123. The event access policies 123 are established by the data owner. The event access policies 123 identify data items that are accessible for querying and are generated by the data owner, or in other words the business entity controlling the data 114. Accordingly, the audit application 120 may include an interface that enables a user to add new access policies, change existing access policies, and delete existing access policies. As soon as an access policy is added to event access policies 123 the policy is active. Active policies cause records to be generated in the event access table 135. The records are generated as matching blocks are generated in the chainable event graph 131. Each event access policy identifies at least one field name to be extracted from the event that is recorded in the block. In some implementations, the event access policy may also identify an event. For example, an event access policy that identifies a last name as the field to be extracted may also identify a certain event type, such as "customer lookup." The event type prevents every last name encountered from being recorded in the event access table; instead only last names for certain events are recorded. In some implementations, the event access policy may also specify more than one field to be extracted from the event data. For example, a policy may identify age and state to be extracted from the event data. Event access policies are flexible and can be any combination of fields to address various needs/demands of the business entity.

When the audit application 120 generates a new block in the chain, the audit application 120 may compare the event access policies 123 against the event being recorded in the chainable event graph 131. If a policy applies, the audit application 120 may write a record to the event access table 135. What is written in the event access table 135 depends on what data fields are identified in the event access policy that applies. An event access policy 123 applies to an event when the event types match, if an event type is provided in the policy. An event access policy 123 applies to an event when the policy lacks an event type but the field identified in the event access policy is included in the content being written to the block.

The event access table 135 includes records that associate a group identifier with one or more fields extracted from events captured in the chainable event graph 131. The group identifier is generated for each transaction, as defined by the business entity that owns the data 114. The group identifier uniquely identifies the transaction, as defined by the business entity. Each event that is a part of the transaction shares the same group identifier. The audit application 120 may keep track of the group identifiers for open or current transactions.

In some implementations, the audit application 120 may include a query API (Application Program Interface) 125. In some implementations, the query API 125 may be one of the applications 112. The query API 125 includes computer code that enables a user to query the blocks in the chainable event graph 131 using the event access table 135. The user may be a user authenticated to the event host 110a, e.g., using client 170 or a computer system internal to event host 110a. The user may also be a connected device or application. For example, in some implementations, an application running on event host 110b may send a query for the event access table 135 via the query API 125.

The client 170 may be a personal computing system, a terminal, a laptop, a tablet, a wearable computing device (e.g., a watch or smart glasses), or another mobile device such as a smartphone, an iPad or an iPad mini. The client 170 may include one or more processors 172 (e.g., a processor formed in a substrate) configured to execute instructions stored in memory 174, such as main memory, RAM, flash, cache, or disk. The client 170 may also include input devices 179, such as a microphone, a keyboard (virtual or physical), a touch screen, a mouse, a camera, a voice recorder, etc. The client 170 also includes a display 178 or other output device. The client 170 may also include one or more applications 176 that perform various functions, e.g., a browser, a word processing program, a spreadsheet program, an email client, a mobile application etc. The client 170 may communicate with the event host 110*a* (and/or event host 110*b*, 110*n*, etc.) via applications 176 using known techniques.

The environment 100 can also include several different event hosts, such as event host 110*b* and event host 110*n*. Although not illustrated in FIG. 1, event host 110*b* and event host 110*n* may also include components illustrated for event host 110*a*. In some implementations, one or more of the event hosts may be operated by the same business entity, e.g., as a distributed system. In some implementations, the query API 125 may be configured to access an event access table 135 and chainable event graph 131 stored at another event host 110. In some implementations, the query API 125 may be configured to coordinate a query with another query API executing on another event host 110.

The configuration of the event host 110*a* is one example and implementations include other configurations. For example, capabilities performed by the audit application 120 may be included in one or more of the application 112. Likewise, the query API 125 may be a standalone module or may be included in one or more of the applications 112. Similarly, the data, such as one or more of data 114, event access table 135, and chainable event graph 131 may be distributed across several computing devices and/or may be accessible by, but physically remote from, the event host 110*a*. Moreover, the environment 100 represents an example environment. Although illustrated with specific components in FIG. 1, the environment 100 may include additional components not illustrated, or may not include all elements shown. In addition, some components may be combined into a single component. Moreover, the event host 110*a* is understood to be configured to comply with any applicable laws, regulations, or other conditions relating to the data input and the data obtained from the data sources.

Figure 2:
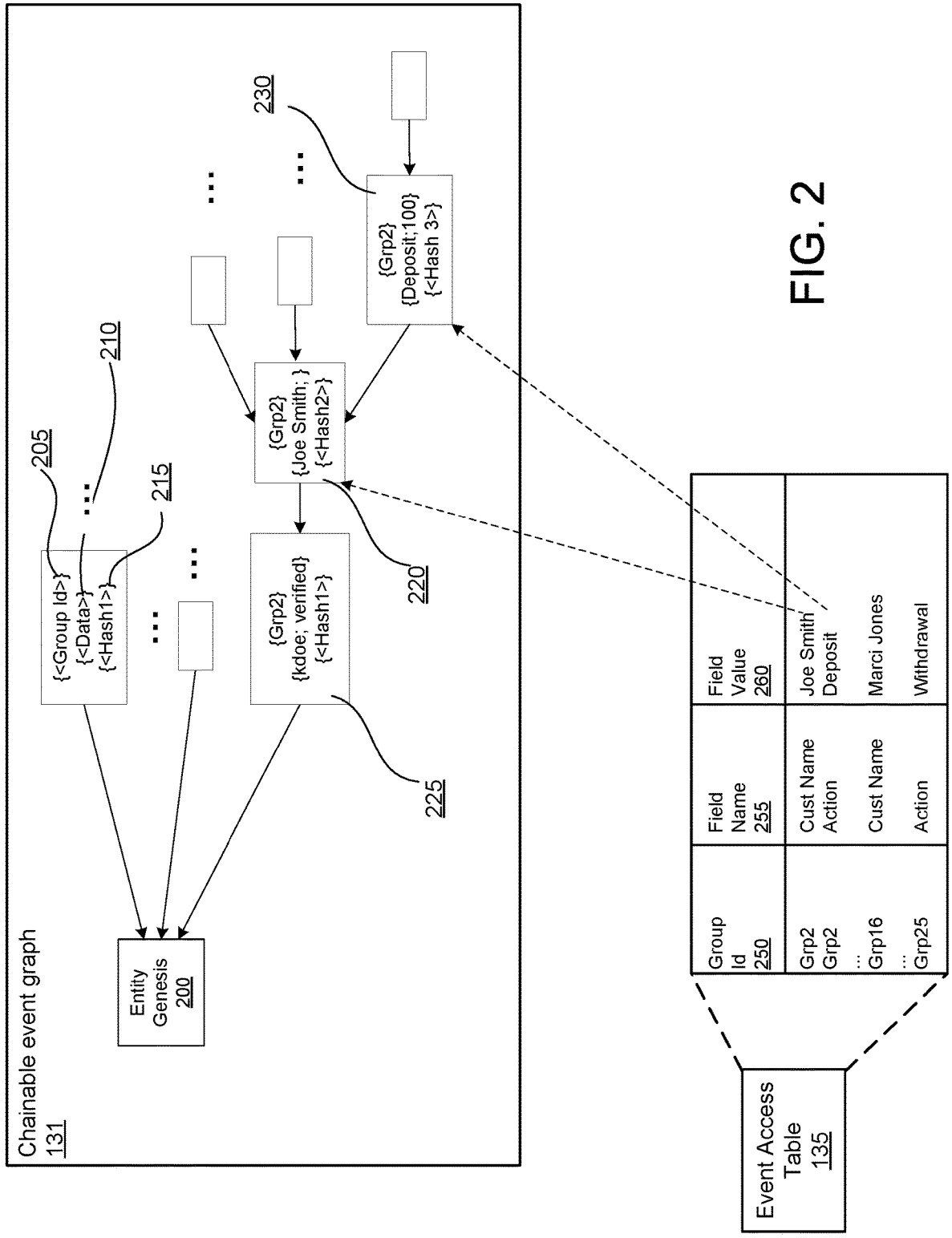
FIG. 2 describes a block diagram of example schema elements enabling the query of chainable event block data, according to a disclosed embodiment.

FIG. 2 is a block diagram of example schema elements enabling the efficient access of chainable event block data, according to a disclosed embodiment. The chainable event graph 131 includes a genesis block 200. The genesis block 200 is the root of the Merkle tree. In some implementations, the genesis block 200 lacks a group identifier. In some implementations, the genesis block 200 has a group identifier that uniquely identifies the genesis block. All chains originate from the genesis block 200. The chainable event graph 131 may have hundreds, thousands, or even millions of chains. Each block in the chainable event graph 131 includes a group identifier 205, content 210, and a hash 215 of the predecessor block. The group identifier is assigned to a transaction and is the same for all blocks in the chain. In some implementations, a block may be associated with multiple group identifiers. For example, the block may be identified with a first group identifier for the transaction and may be associated with a second group identifier for a branch within the transaction. In some implementations, each branch may have its own group identifier. In some implementations, only certain branches, e.g., triggered by specific events, may have its own group identifier. Having multiple group identifiers may work well when the chains are long and with many branches.

The content 210 represents the data recorded in the block. The content may also be referred to as the payload. The content 210 represents one or more items of data. The content 210 portion may be encrypted before it is stored in the block. The content 210 portion may have some data elements encrypted and others not encrypted. The data in the content 210 portion can be stored in any manner; e.g., as a list, name-value pairs, a single string, or any other method implemented by the business entity. The hash 215 is a hash of the predecessor data block. The hash 215 includes all data written in the predecessor block, including the group identifier 205, the content 210, and the hash 215. Thus, for example, Hash2 illustrated in block 220 is a hash of the group identifier Grp2, the content {kdoe; verified} and the value of Hash1. The solid arrows illustrated in the chainable event graph 131 are for ease of explanation only and are not part of the chainable event graph 131. In other words, there is no memory pointer from block 220 to block 225. As explained herein, the only way to determine that block 225 is the predecessor of block 220 is to hash the content of block 225 and compare it to the value of Hash2. If there is a match, the relationship between blocks 220 and 225 is established, i.e., block 225 is the predecessor of block 220. Similarly, to determine that block 230 is a successor of block 220, the system would hash block 220 and match the hash to the value of Hash3.

The event access table 135 is illustrated in FIG. 2 as having three columns; the group identifier 250, the field name 255, and the field value 260. However, implementations may include other data elements in the event access data, depending on the user's configuration and preferences. Reference to a field, as used herein, refers to either the field name 255, the field value 260, or both, depending on context. For example, a query may have a field as a parameter. It is understood that the field represents a certain type of data (e.g., the field name) and has a value, so referring to the query parameter refers to the type of data and its value. Similarly, an event access policy may be said to identify a field. In this sense the policy specifies a field type, as the policy itself does not relate to any specific value. Likewise, a block in a chain may include one or more fields in the content 210; however the block may only store the value of the field. In some implementations, the field name (type) may be implied. In some implementations, the field name may be determined based on the position of the field within the content, for example the order in a comma delimited list or the byte positions. In some implementations, the field name may be paired with the value.

In the example of FIG. 2, the data illustrated in the chainable event graph 131 and the event access table 135 are for a financial institution. In this example, a customer, Joe Smith has come to a bank to deposit 100. The bank teller may log into (or has already logged into) the bank system as user kdoe. To complete the transaction, the teller may first verify an debit card and then pull up Joe Smiths account information. The teller may provide an account balance and then make the deposit for Joe. Joe may also request a certified check while at the window. In this scenario, all of the actions that the teller performs on behalf of Joe can be defined as one transaction and have the same group identifier. In other scenarios (not shown), each individual action may be a separate transaction with different group identifiers. Thus, as explained above, the definition of a transaction is an implementation detail and disclosed embodiments work regardless of the detail. Two records in the event access table 135 illustrated in FIG. 2 are from the transaction with Joe, although it is understood that the transaction may have generated additional records not illustrated for ease of explanation. Indeed, it is understood that the event access table 125 has many more records than those illustrated.

In the example of FIG. 2, one row includes the customer name field and the other row includes an action field. The row with the customer name corresponds with block 220 in the chainable event graph 131. A dashed arrow is illustrated in FIG. 2 to illustrate the link between the record in the event access table 135 and the block. Implementations need not have an actual pointer (e.g., a memory point) from the records in the event access table 135 and the block. Instead, if the row with the customer name is responsive to a query, the system may use the group identifier of Grp2 to look for all blocks in the chainable event graph 131 with the group identifier of Grp2. As each block is identified, the system may determine whether the block includes content matching the field value 260, i.e., matching Joe Smith. In some implementations, the system may need to decrypt the content 210 portion of a block before determining if the content matches the event access table record. Once a block is located, the system has found a matching block and can follow the chain. The system may follow the chain to obtain additional fields from the content of predecessor blocks. In some implementations, all blocks in the chain (except the genesis block) may be returned as a search result. The system may follow the chain to verify that the chain is unbroken. If a chain is broken then the audit records have been tampered with. If the chain is broken, the system may provide an indication that the chain was broken, e.g., that a particular block is suspicious. In some implementations, the system may follow the chain from the matched node to the leaf nodes. For example, instead of looking for a block with the same group number that, once hashed, matches the hash stored in the current block, the system may hash the contents of the current block and look for blocks with the same group number that have a hash 215 that matches the hashed content. This may be repeated until a leaf (or leaves, if the chain branches) are located. Following the chain to the root or to one or more leaves is an implementation decision; disclosed embodiments work regardless of how a chain is followed from a block matching an event access record.

Figure 3:
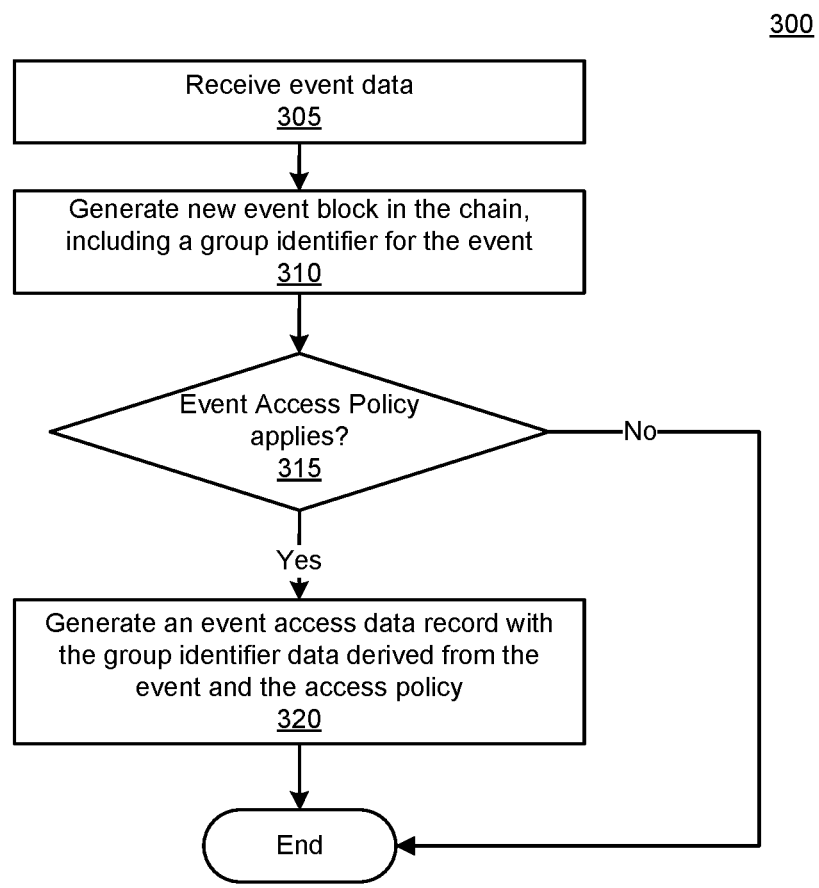
FIG. 3 illustrates a flowchart of an example process of generating schema elements that enable the query of chainable event block data, according to a disclosed embodiment.

FIG. 3 illustrates a flowchart of an example process 300 of generating schema elements that enable efficient access of chainable event data, according to a disclosed embodiment. Efficient access is access that occurs in an online query process without specialized hardware (e.g., banks of GPUs). The schema elements include event access records and group identifiers, as explained below. Process 300 may be performed by a system, such as event host 110a of FIG. 1, as part of an auditing process that generates audit records for events occurring on the system. Process 300 applies event access policies against events that are written to a block in an event chain to generate rows in an event access table. Process 300 may begin when an event to be inserted into the chain of events is received (305). The event can be the first event in a transaction, in which case the system generates a new group identifier. The event can also be a later event in a transaction, in which case the system uses a group identifier previously generated for the transaction. The system generates a new event block for the event (310) using known techniques. The block includes the group identifier for the event. The block also includes content extracted from or otherwise describing the event. The content written to the block is an implementation choice. For example, a block may only include a few fields. As another example a block may include several fields. The number of fields (e.g., the amount of data) included in the content of a block is an implementation choice that does not affect the schema described herein. If the event is a first event in a transaction the block may be the first block of a new chain.

The system attempts to apply an event access policy to the event (315). Applying the event access policy can include determining whether the event is of a type identified in the event access policy. If the event is of the type of event identified in the event access policy, then the event access policy applies. Applying the event access policy can include determining whether the event includes a particular field. In some implementations, the event access policy applies when the event type matches and the event includes a particular field. The event access policy may also specify other conditions. If the conditions represented by the event access policy are satisfied by the event, the event access policy applies (315, Yes) and the system generates an event access record (320). The event access record includes data derived from the event as well as the group identifier for the event. In some implementations, the event access policy may specify what field to include in the event access record. In some implementations, a field matching a condition in the event access policy is included in the event access record. In some implementations, more than one event access record may be generated for the event, e.g., if the applicable event access policy indicates that two fields are recorded in the event access records. If multiple event access policies apply, the system generates multiple event access records. Process 300 then ends, having generated an event block tagged with the group identifier for the transaction and, if at least one event access policy applies to the event, an event access record that can be used to later locate the block with reduced computing resources.

Figure 4:
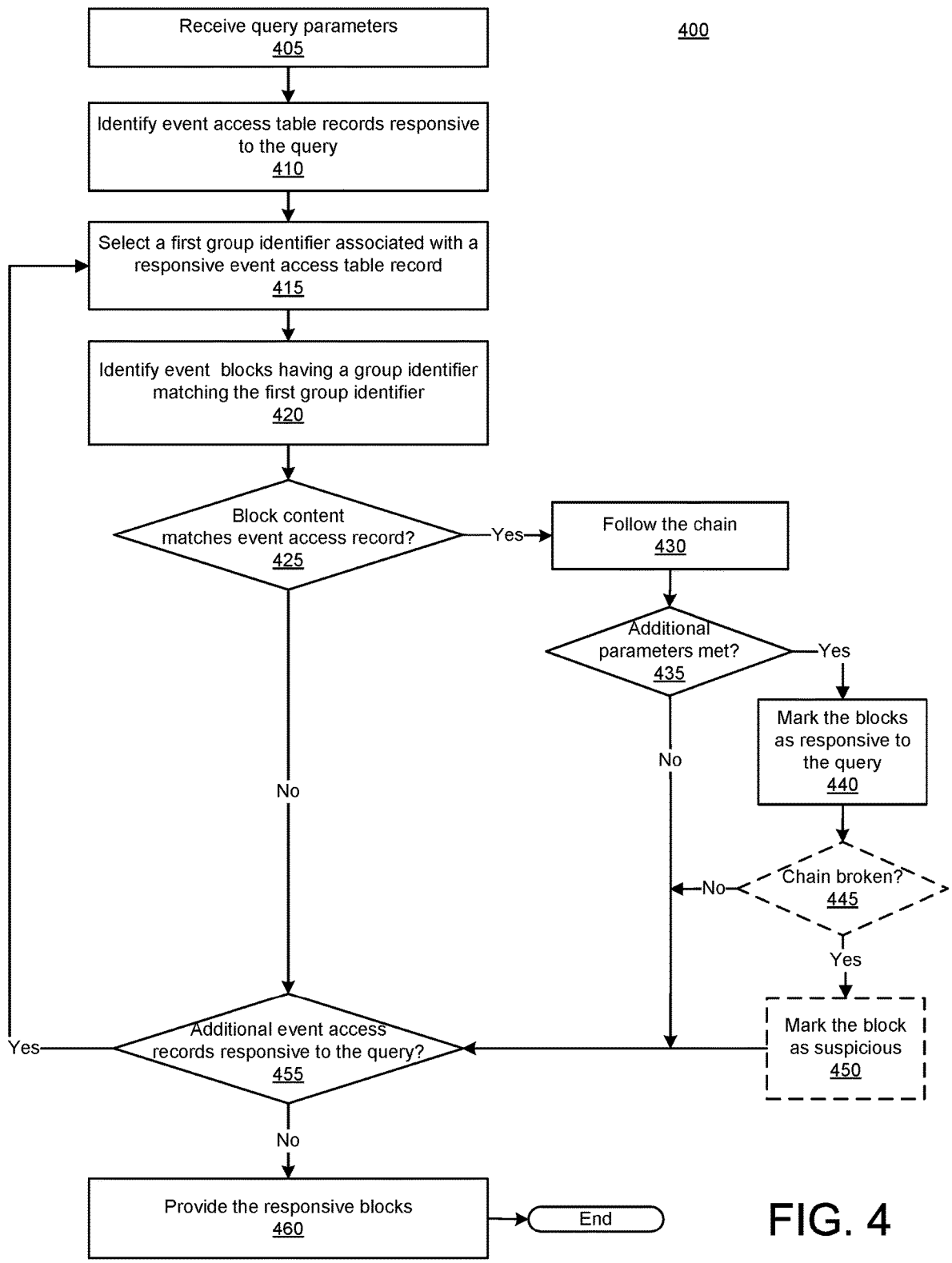
FIG. 4 illustrates a flowchart of an example process for using the schema elements to query chainable event block data, according to a disclosed embodiment.

FIG. 4 illustrates a flowchart of an example process 400 for using the schema elements to access blocks in chainable event data, according to a disclosed embodiment. Process 400 is an example of a query process that reduces query latency by reducing the computer cycles needed to identify responsive data in chainable event blocks. Process 400 may be performed by an event host, such as system 110a of FIG. 1. Process 400 takes a query provided by a user and provides event blocks in response to the query. Process 400 does not necessarily represent an entire query process. For example, the responsive blocks may be returned to a process that extracts information from the blocks to provide as a query result. Thus, rather than returning event blocks, a complete query process may return particular fields via a user interface (e.g., display, printer, or speakers). Also, although illustrated as returning only responsive blocks in a chain, it is understood that some implementations may return all blocks in an unbroken chain in response to the query.

Process 400 may begin in response to receiving query parameters (405). The query parameters may specify one or more fields. The fields may be controlled by the business entity via a specific API. For example, the business entity may make only certain fields available for the user to provide as parameters. In some implementations, the fields may be limited to fields included in the event access table. In some implementations, the fields may include the fields in the event access table and other specified fields. The query parameter may be in the form of a regular expression, as is known. The system may identify records in the event access table that are responsive to the query (410). For example, if the query parameter is a customer name, the system may search for customer names in the event access table matching the parameter. Each record in the event access table that is responsive to the query has a group identifier. The system uses the group identifiers to locate responsive event blocks. Locating responsive event blocks may be done serially (as shown) or in parallel.

For example, the system may start with a first group identifier (415) and identify blocks in the chainable event graph that match the group identifier (420). This greatly reduces the number of hash computations needed to follow a chain. In systems where the content of a block is also encrypted, it also reduces the number of encryptions needed to identify the corresponding block. The system looks for a block that has content matching the field from the event access record (425). If none of the blocks with the group identifier have content matching the event access record (425, No), the system continues with a next event access record (455) having a different group identifier. If one of the blocks does have content matching the event access record (425, Yes), the block is considered a responsive block and the system may follow the chain (430) from the responsive block to the genesis block, using the blocks identified in step 420. Reducing the population of blocks inspected in following the chain to those blocks sharing the group identifier of the responsive block greatly reduces the number of hash computations the system needs to perform, which in turn results in faster query response time. As described above, the system may hash the blocks to find a block whose hash matches the hash stored in the responsive block. Once this block is found, the system finds the block that, once hashed, matches the hash of the predecessor block, etc. The chain is considered unbroken if each successor block is able to locate a predecessor block. In some implementations, the chain is considered unbroken if each successor block is able to locate a predecessor block and the content of the predecessor block, after hashing, matches the hash value of the successor. In some implementations, the system automatically includes the genesis block in the blocks that match a group identifier. Thus, the chain can always be followed back to the genesis block. In some implementations, the system may maintain each unique group identifier, which increases the robustness of the system. In some implementations, the system may also or instead follow the chain to a leaf node. To follow the chain to a leaf node, the system may generate a hash of the responsive block and look for a block with the same group identifier that has a hash field matching the hash. Using this technique, the system may follow a chain backwards to a leaf (or leaves, if the chain branches).

In some implementations, the system may allow query parameters that are not identified in the event access table. In other words, the system may use an event access record to identify event blocks associated with one of the query parameters, but a second query parameter may be applied to further narrow the search results. If the query includes any parameter fields that have not yet been met, the system may attempt to match the additional parameters when following the chain (435). For example, as each block in the chain is located the system may compare the content of the block with the additional query parameters. If the additional query parameters are not met (435, No) the system may discard the chain and not consider any block responsive, resuming the search with another group identifier at step 455. If the additional query parameters are met or there are not additional query parameters (435, Yes), the system may mark the blocks as responsive (440). In some implementations, all blocks in the chain to the root and/or to the leaf) are marked as responsive. In some implementations, only blocks that include content matching a query parameter are marked as responsive.

In some implementations, the system also determines whether the chain is broken (435). The chain is broken when the system is unable to reach the genesis block. The chain may also be considered broken if the system is unable to reach a leaf. If the chain is broken (445, Yes), the system may mark the responsive block(s) as suspicious (450). Marking the responsive block as suspicious may include returning a flag that indicates that the audit records report a problem in the chain. Once the system has finished inspecting the blocks associated with the first group identifier, the system may determine whether there is another group identifier identified in a responsive event access record that has not yet been inspected (455). If there is (455, Yes), the system selects the next group identifier and repeats steps 420 to 450. When all group identifiers have been processed (455, No), the system provides the responsive blocks as a search result for the query (460). As explained earlier, the responsive blocks may be returned to a process that formats the responsive blocks into content acceptable for presentation to the user. Thus, while process 400 ends, additional processing may take place before a result is presented to the query requestor.

A working example in the healthcare industry is now described. This example is provided to aid in the understanding of this disclosure and implementations are not limited to the specific scenario described, as the methods and techniques can be adapted to other types of environments, as described above. Implementations thus include adaptations of the underlying technology and techniques to other industries.

Healthcare data is one example of data that is subject to regulations, including audit requirements. Implementations may use an auditing API that enables a healthcare entity to define access policies (e.g., which fields are tracked in the access table) that can be used to later access the audit data, i.e., the chainable event block data. For example, a healthcare entity may determine that only patient names can be queried, so that patient names are captured in the event access table. Thus, a user may query the chainable event audit records by patient name. In some implementations, any blocks pertaining to the patient, i.e., that include the patient name, may be returned. In some implementations, blocks in a chain pertaining to the patent may be returned. In some implementations, once a chain relating to the patient is identified the system may verify that the chain is unbroken by following the chain to the genesis record, to a leaf record, or both. Another healthcare entity may determine that patient name and drug name may be queried. Thus, chainable event audit records generated in an electronic prescription system may be queried either by drug or patient name, or both. In such a scenario the entity access policies may specify patient name and drug name for any events that include a prescription.

Without the techniques disclosed herein, online querying the chainable event audit data would be impractical due to the computational delay between submission of a query and generation of the response. Disclosed techniques also offer a flexible schema that an entity can customize, exposing only the data the entity identifies for query purposes. Other data would not be searchable. Thus, the features described herein provide improved search functionality in a computing system.

In the configurations described above, a computer processor can refer to one or more computer processors in one or more apparatuses or any combinations of one or more computer processors and/or apparatuses. An aspect of an embodiment relates to causing and/or configuring one or more apparatuses and/or computer processors to execute the described operations. The results produced can be output to an output device, for example, displayed on the display, played on speakers, etc. An apparatus or device refers to a physical machine that performs operations, for example, a computer (physical computing hardware or machinery) that implement or execute instructions, for example, execute instructions by way of software, which is code executed by computing hardware including a programmable chip (chipset, computer processor, electronic component), and/or implement instructions by way of computing hardware (e.g., in circuitry, electronic components in integrated circuits, etc.)—collectively referred to as hardware processor(s), to achieve the functions or operations being described. The functions of embodiments described can be implemented in any type of apparatus that can execute instructions or code.

More particularly, programming or configuring or causing an apparatus or device, for example, a computer, to execute the described functions of embodiments creates a new machine where in case of a computer a general purpose computer in effect becomes a special purpose computer once it is programmed or configured or caused to perform particular functions of the embodiments pursuant to instructions from program software. According to an aspect of an embodiment, configuring an apparatus, device, computer processor, refers to such apparatus, device or computer processor programmed or controlled by software to execute the described functions.

A program/software implementing the embodiments may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD). Examples of the optical disk include a DVD (Digital Versatile Disc), DVD-ROM, DVD-RAM (DVD-Random Access Memory), BD (Blu-ray Disk), a CD-ROM (Compact Disc-Read Only Memory), and a CD-R (Recordable)/RW. The program/software implementing the embodiments may be transmitted over a transmission communication path, e.g., a wire and/or a wireless network implemented via hardware. An example of communication media via which the program/software may be sent includes, for example, a carrier-wave signal.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the dynamic relation/event detector and its components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

In one general aspect, a system includes at least one processor and a chainable event graph storing event blocks, each event block including a group identifier, content, and a hash, and wherein the hash of a first block in each chain is a hash of a genesis block for the graph. The system also includes memory storing event access policies, each event access policy identifying an event type and at least one field for the event type and storing an event access table having access records generated from applying the event access policies to events of a transaction, each access record having a group identifier and a field. The system also includes memory storing instructions that, when executed by the at least one processor, cause the system to perform operations. The operations can include receiving a query, identifying responsive access records in the event access table, the responsive access records each having a field matching a parameter of the query, identifying potential responsive event blocks in the chainable event graph, each potential responsive event block having a group identifier matching a group identifier from the responsive access records, identifying responsive event blocks from the potential responsive event blocks by identifying content from each potential responsive event block matching the field from the responsive access record a group identifier matching the group identifier from the potential responsive event block, and providing at least some of the responsive event blocks as a search result for the query.

These and other aspects can include one or more of the following features. For example, the operations can further include, for each responsive event block: determining whether a chain for the responsive event block is broken; and responsive to determining the chain is broken, providing an indication that the responsive event block has a broken chain. As another example, the operations can further include receiving an event for a new transaction, generating a new group identifier for the transaction, and generating a new event block for the event in the chainable event graph, the new event block including the new group identifier. As another example, the operations may further include receiving a new event, generating a new event block for the new event in the chainable event graph, the new event block including a group identifier for a transaction of which the event is a part, determining that an event access policy applies to the new event, and writing a record to the event access table, the record including the group identifier from the event block and a field value extracted from the new event. In some implementations, the operations may further include determining that the new event is a first event in the transaction and generating the group identifier for the transaction and/or determining that the new event is not a first event in the transaction and using the group identifier previously generated for the transaction. As another example, the operations may further include identifying additional responsive event blocks from the potential responsive event blocks by following the chain from the responsive event block to the genesis block, wherein the additional responsive event blocks are provided with the search result. As another example, at least one additional event block may include content responsive to the query that is not included in the responsive access records.

According to one aspect, a method includes receiving at least one query parameter and, responsive to receiving the at least one query parameter, identifying an event access data record that includes a group identifier and a field matching the query parameter. The method also includes locating potential responsive blocks, the potential responsive blocks being event blocks in a chain that include the group identifier, and each of the potential responsive blocks also including content and a hash of a predecessor block. The method also includes identifying a first block of the potential responsive blocks that has content that includes the field matching the query parameter, and providing the first block as a response to the query.

These and other aspects can include one or more of the following features. For example, the method may also include determining whether a chain from the first block to a genesis block of the chain is broken and responsive to determining the chain is broken, providing an indication that the first block is suspicious as part of the response to the query. As another example, the method may also include following a chain from the first block to a genesis block to obtain additional data items from the content of potential responsive blocks in the chain, and including the additional data items in the response to the query. In some implementations, following the chain includes generating a hash of at least a second block of the potential responsive blocks, and comparing the hash to the hash in the first block, wherein the second block is in the chain when the hash matches. In some implementations, the additional data items may be specified by additional query parameters. As another example, an event access record may identify the group identifier, a field name, and a field value. As another example, the method may also include identifying at least a second event access data record responsive to the query parameter, the second event access data record including a second group identifier, locating second potential responsive blocks, the second potential responsive blocks being event blocks in a chain that include the second group identifier, identifying a second block of the second potential responsive blocks that has content that includes a field matching the query parameter, and providing the second block with the first block as the response to the query.

According to one general aspect, a method includes generating a group identifier for an event in a transaction, generating a new event block in the chain for the event, the new event block including the group identifier, content for the event, and a hash of a genesis block of the chain, determining whether an event access policy applies to the event, and responsive to determining that an event access policy applies, generating an event access record identifying the group identifier, a field name identified in the event access policy, and a field value derived from the event.

These and other aspects can include one or more of the following features. For example, the method may also include using the event access record to identify the block in response to a query specifying the value for the field. As another example, the method may also include receiving query parameters, identifying the event access record as responsive to the query, identifying the block using the group identifier, and providing the block as a response to the query. As another example, an event access policy may identify an event type and at least one field and the event access policy may apply to the event responsive to determining that a type for the event matches the event type. As another example, the event block may be a first block and the method may also include generating a second event block for a second event in the transaction, the second block including the group identifier, content for the second event, and a hash of the first block, determining whether an event access policy applies to the second event, and responsive to determining that an event access policy applies, generating a second event access record identifying the group identifier, a field name identified in the event access policy, and a field value derived from the second event.

According to one general aspect, a non-transitory computer-readable medium stores instructions that, when executed by at least one processor, cause a computing device to perform any of the operations or methods disclosed herein.

According to one general aspect, a system comprises at least one processor and a memory storing instructions that, when executed by the at least one processor, cause the computing system to perform any of the operations or methods disclosed herein.

What is claimed is:

1. A method comprising:
    providing a user interface configured to enable a user to manage event access policies, the event access policies including at least a first event access policy identifying a first field and a second event access policy identifying a second field; and
    applying the event access policies to incoming transactions to generate event access records, wherein:
        determining that the first event access policy applies to a transaction of the incoming transactions results in generation of a first event access record, the first event access record including a field value captured from the transaction for the first field and a group identifier generated for the transaction, and
        determining that the second event access policy applies to a transaction of the incoming transactions results in generation of a second event access record, the second event access record including a field value captured from the transaction of the incoming transactions for the second field and a group identifier generated for the transaction,
    wherein event blocks are written to an event graph for the incoming transactions independent of applying the event access policies, each event block including a group identifier, content, and a hash for a transaction of the incoming transactions.

2. The method of claim 1, further comprising:
    receiving, via the user interface, an indication of removal of the first field; and
    deleting the first event access policy from the event access policies,
    wherein responsive to deleting the first event access policy from the event access policies, applying the event access policies to incoming transactions will not generate additional event access records that include the first field.

3. The method of claim 2, further comprising:
    providing a query user interface configured to expose accessible fields for querying the event graph,
    wherein:
        prior to deleting the first event access policy, the first field is an accessible field for querying, and
        subsequent to deleting the first event access policy, the first field is not an accessible field for querying.

4. The method of claim 1, further comprising:
    providing a query user interface configured to expose accessible fields for querying the event graph, wherein the accessible fields for querying include fields identified in the event access policies.

5. The method of claim 4, further comprising:
receiving a query;
identifying a record in the event access records that is responsive to the query, the record including an accessible field matching a parameter of the query and including a group identifier;
locating potential responsive event blocks in the event graph, the potential responsive event blocks being event blocks in the event graph that include the group identifier; and
providing data from a responsive event block of the potential responsive event blocks as a response to the query.

6. The method of claim 5, wherein the parameter is a first parameter and the query includes a second parameter and the method further comprises:
determining that content of a second block in a chain that includes the responsive event block includes content that matches the second parameter; and
providing the data from the responsive event block in response to determining that the content of the second block matches the second parameter.

7. The method of claim 5, further comprising:
determine that a chain that includes the responsive event block is not broken; and
providing the chain is not broken.

8. The method of claim 5, further comprising:
determining that a chain that includes the responsive event block is broken; and
providing an indication that the chain is broken with the response to the query.

9. The method of claim 1, wherein the first event access policy identifies the first field and an event type and determining that the first event access policy applies to the incoming transactions includes:
determining that a transaction of the incoming transactions is of the event type; and
determining that the transaction includes the first field.

10. The method of claim 1, wherein the event graph is an audit blockchain.

11. A system comprising:
at least one processor;
memory storing an audit blockchain;
memory storing event access policies, the event access policies including at least a first event access policy identifying a first field and a second event access policy identifying a second field;
memory storing event access records; and
memory storing instructions that, when executed by the at least one processor, causes the system to perform operations including:
applying the event access policies to incoming transactions to generate the event access records, wherein:
determining that the first event access policy applies to a transaction of the incoming transactions results in generation of a first event access record, the first event access record including a field value captured from the transaction for the first field and a group identifier generated for the transaction,
determining that the second event access policy applies to a transaction of the incoming transactions results in generation of a second event access record, the second event access record including a field value captured from the transaction of the incoming transactions for the second field and a group identifier generated for the transaction, and
blocks are written to the audit blockchain for the incoming transactions independent of applying the event access policies.

12. The system of claim 11, further comprising a user interface configured to enable a user to manage the event access policies, wherein the operations further include:
receiving, via the user interface, an indication of removal of the first field; and
deleting the first event access policy from the event access policies,
wherein responsive to deleting the first event access policy from the event access policies, applying the event access policies to additional incoming transactions will not generate additional event access records that include the first field.

13. The system of claim 12, further comprising providing a query user interface configured to expose accessible fields for querying the audit blockchain, wherein the operations further include:
prior to deleting the first event access policy, the first field is an accessible field for querying, and
subsequent to deleting the first event access policy, the first field is not an accessible field for querying.

14. The system of claim 11, the operations further including:
providing a query user interface configured to expose accessible fields for querying the audit blockchain, wherein the accessible fields for querying include fields identified in the event access policies.

15. The system of claim 14, the operations further including:
receiving a query;
identifying a record in the event access records that is responsive to the query, the record including an accessible field matching a parameter of the query and including a group identifier;
locating potential responsive blocks in the audit blockchain, the potential responsive blocks being blocks in the audit blockchain that include the group identifier; and
providing data from a responsive block of the potential responsive blocks as a response to the query.

16. The system of claim 15, wherein the parameter is a first parameter and the query includes a second parameter and the operations further include:
determining that content of a second block in a chain that includes the responsive block includes content that matches the second parameter; and
providing the data from the responsive block in response to determining that the content of the second block matches the second parameter.

17. The system of claim 15, the operations further include:
determine that a chain that includes the responsive block is not broken; and
providing the chain is not broken.

18. The system of claim 15, the operations further include:
determining that a chain that includes the responsive block is broken; and
providing an indication that the chain is broken with the response to the query.

19. The system of claim 11, wherein the first event access policy identifies the first field and an event type and determining that the first event access policy applies to the incoming transactions includes:

determining that a transaction of the incoming transactions is of the event type; and determining that the transaction includes the first field.

20. The system of claim 11, wherein a block in the audit blockchain for an incoming transaction of the incoming transactions includes a group identifier, content, and a hash.

* * * * *